US005975726A

United States Patent [19]

Latimer

[11] Patent Number: 5,975,726

[45] Date of Patent: Nov. 2, 1999

[54] HIGH MAST LIGHTING SYSTEM

[75] Inventor: Michael Latimer, Acton, Canada

[73] Assignee: Quality Lighting, Franklin Park, Ill.

[21] Appl. No.: 08/934,079

[22] Filed: Sep. 19, 1997

[51] Int. Cl.[6] .................................................. B60Z 1/12

[52] U.S. Cl. .......................... 362/384; 362/286; 362/403; 362/250; 362/391; 362/431

[58] Field of Search .................................... 362/386, 384, 362/286, 285, 403, 405, 406, 418, 250, 391, 431; 248/320; 403/320; 24/328

[56] References Cited

U.S. PATENT DOCUMENTS

| | | | |
|---|---|---|---|
| 3,721,816 | 3/1973 | Zeller | 362/403 |
| 3,801,813 | 4/1974 | Kiehn | 362/403 |
| 4,115,845 | 9/1978 | Blahut | 362/403 |

*Primary Examiner*—Nimeshkumar D. Patel
*Assistant Examiner*—Michael J. Smith
*Attorney, Agent, or Firm*—Fitzpatrick, Cella Harper & Scinto

[57] ABSTRACT

A high mast lighting system is disclosed in which an elongated vertical mast having upper and lower ends is surrounded by an annular support ring. The support ring has a plurality of lamps removably mounted thereon. Drive means is provided for raising and lowering the ring along the mast between its upper and lower ends. A plurality of guide rollers are mounted on the upper end of the mast with a plurality of flexible cables operatively connected at one end to the ring and guided over the rollers on the mast. The opposite ends of the cables extend downwardly from the rollers into the mast where they are operatively connected to the drive means which selectively moves the cables upwardly and downwardly in the mast to raise and lower the ring. The system includes a rigid hollow latching arm associated with at least one of the cables and pivotally connected to the ring above the connection of its associated cable to the ring with the cable passing through the arm. A latch member is mounted on the upper end of the mast in association with the latching arm and is adapted to engage cooperating means on the latching arm for selectively releasing the arm in the ring for lowering the ring and for latching the ring in its uppermost position. The ring also includes an inner wall facing the mast and resilient bumper means mounted thereon.

22 Claims, 7 Drawing Sheets

HIGH MAST LIGHTING SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The present invention relates to high mast lighting systems such as are used on highways and toll plazas.

High mast lighting systems include a vertically elongated central mast or pole surrounded by an annular ring or other shaped platform on which a plurality of light fixtures are mounted. The annular ring is adapted to be raised to the top of the mast and supported there in a locked position during use. A drive mechanism is provided to lower the ring to the base of the mast in order to facilitate maintenance and lamp changes. Typically, the support rings in high mast lighting systems are raised and lowered by the drive means through a plurality of cables secured to the ring and passing downwardly from pulleys on top of the mast into the ring to the drive means.

High mast lighting systems can attain great height, of over 100 feet or more, with the result that they are subjected to severe stresses, particularly during heavy weather. Therefore, it is imperative that the support ring be secured in a fixed position such that it can withstand the great forces to which it is subjected, while at the same time allowing easy maintenance of the system.

A variety of different types of high mast mounting systems have been previously disclosed in, for example, U.S. Pat. Nos. 4,237,530; 4,139,884; 4,851,980; 4,001,573; 3,856,639; and 3,721,816. Certain of these patents disclose latching mechanisms using cooperative cam arrangements for holding the lamp ring or support in its fixed uppermost position. While such devices have been generally satisfactory in use, it is an object of the present invention to provide an improved latching system which is simple in construction, as compared to the prior art, while providing an extremely secure latching arrangement.

Another object of the present invention is to provide a latching arrangement which provides a positive latch that rigidly secures the ring to the mast in its latched position so that weight is relieved from the cables used to raise and lower the ring itself.

Yet another object of the present invention is to provide a latching arrangement with a simple indicating device that provides a positive indication that the ring is latched in position.

A still further object of the present invention is to provide an improved mounting arrangement for lamp fixtures on the support ring of a high mast lighting system.

A still further object of the present invention is to provide an improved ring construction that provides a simple bumper arrangement on the interior of the ring which prevents damage to the ring and the mast during the raising and lowering operation should the mast or ring sway during such operation.

BRIEF SUMMARY OF THE INVENTION

In accordance with an aspect of the present invention, the high mast mounting system includes an annular support having an outwardly opening generally C-shaped cross section on which the light fixtures are removably mounted. The mounting for the light fixtures includes a socket in which the inner end of the pole support arm for the lamp is mounted. The socket is configured to mate with the outwardly opening channel of the support ring. It is clamped to the support ring by a rear clamp which is generally C-shaped and complementary to the exterior configuration of the support ring. The clamp has flanges which extend in opposite directions from the free ends of its generally C-shape which are used to bolt the clamp to the socket, thereby firmly holding the socket in place. The inner surface of the web of the C-shaped clamp has a pair of support flanges which receive the bumper structure of the invention. The bumper is formed of a resilient elastomeric or other material having a flat rear wall and a central resilient protuberance. The edges of the flat rear wall are engaged in the flanges on the back of the clamp to hold the bumper in place.

In accordance with another feature of the present invention, the support ring is raised and lowered by a plurality of cables which are fixed to the support ring and trained over a plurality of rollers mounted on the top of the mast. From the rollers the cables are guided downwardly to the interior of the mast. The lower ends of the cables are fixed to a drive plate which is connected by another cable to a winch operated by an electric motor or the like. Rotation of the winch by the electric motor in opposite directions causes the cables to move upwardly and downwardly in the mast to raise or lower the support ring. The latching system of the present invention makes use of this upward and downward mobility of the support ring through the influence of the reversible motor in order to provide a positive latching system.

More specifically, the latching system includes a support arm pivotally mounted on the ring at each of the cables. The support arm is hollow and the cable passes through the support arm from the ring along its path of travel to the guide rollers. The upper end of the support arm has a transverse pin formed thereon. A latching structure is mounted on the top of the support mast and surrounds the cable in its path of travel from the ring to the guide pulleys. The latching structure has a plurality of opposed camming surfaces formed therein between which the support arm and the cable pass. The camming surfaces in the latching member cooperate with the traverse pin of the support arm to latch and unlatch the lamp support ring in its upper position. In its latched position, the transverse pin on the support arm rests in a support pocket of the camming surface so that the weight of the support ring and lamps is carried directly from the mast through the latching structure and the support arm, thereby relieving tension on the cables.

The above, and other objects, features and advantages of the present invention will be apparent from the following detailed description of an illustrative embodiment thereof, which is to be read in connection with the accompanying drawings wherein:

DETAILED DESCRIPTION OF THE INVENTION

Figure 1:
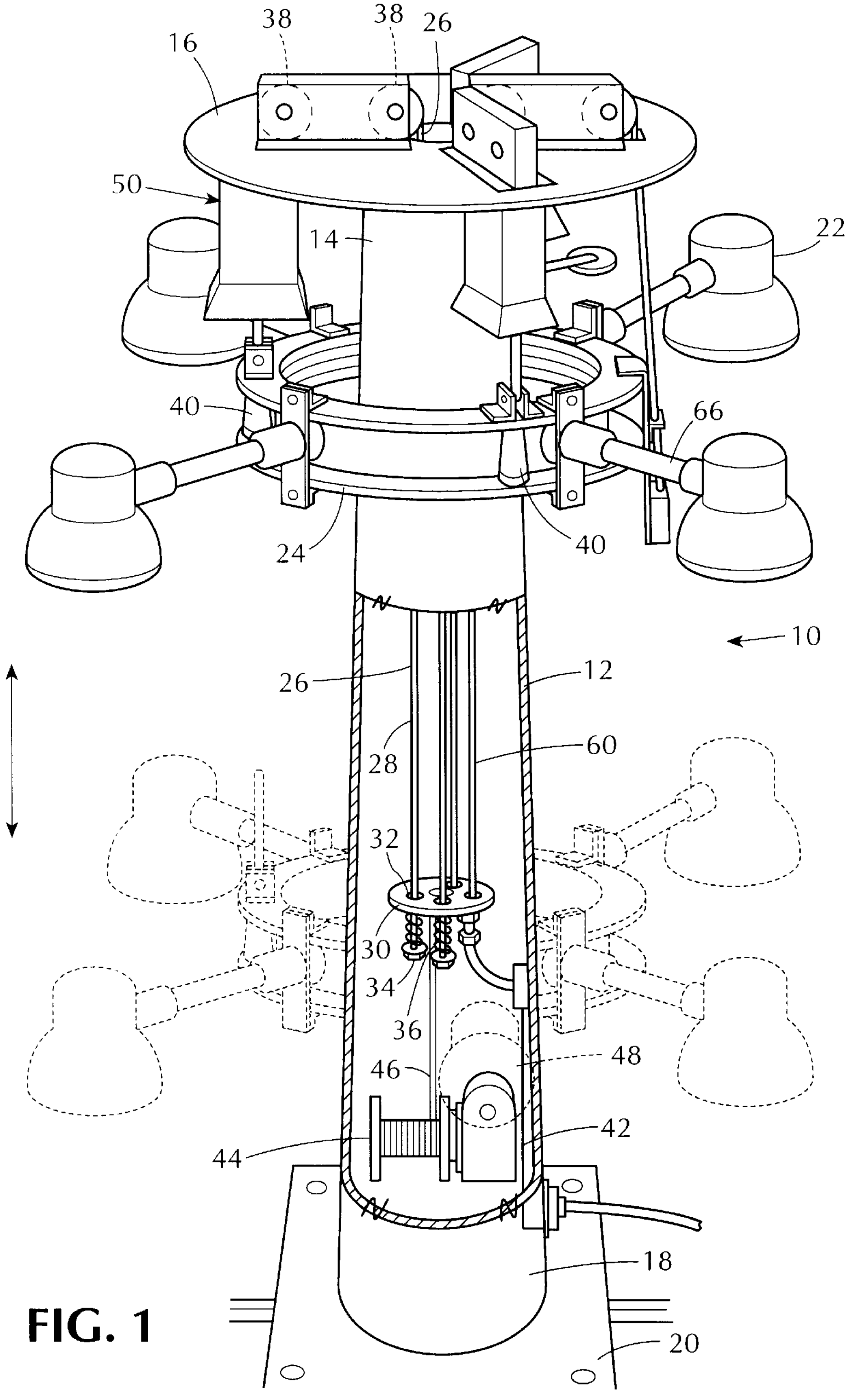
FIG. 1 is a perspective view, with parts broken away, showing the high mast lighting system of the present invention with the lamp support ring shown in solid lines in its upper position and in dotted lines in its lower position.

Referring now to the drawings in detail, and initially to FIG. 1 thereof, a high mast lighting system 10 constructed in accordance with the present invention is illustrated. The lighting system includes a generally conventional elongated hollow support mast 12 formed of steel, aluminum, or the like, in a conventional manner. The mast 12 includes an upper end 14 to which a support platform 16 is rigidly mounted. The lower end 18 of the mast is secured on a foundation (not shown) by a mounting base structure 20, or the like, in any convenient manner.

A plurality of light fixtures 22 are mounted on an annular support ring 24 which surrounds the mast 12. The support ring is raised and lowered through a plurality of cables 26. In the illustrative embodiment of the invention three cables 26 are used.

Cables 26 have lower ends 28 which are secured to a drive disk 30, or the like. Preferably, the cables pass through apertures 32 in disk 30 to ferrules or stop structures 34 at their ends. Springs 36 are secured between the plate 30 and the ferrules 34 to provide some cushioning in the system during raising and lowering operations. Cables 26 are trained or guided over a plurality of guide rollers 38, or the like, mounted on the support platform 16. These rollers may be in the form of pulleys or conventional rollers having flat surfaces, as desired. The particular number, shape and form of these rollers form no part of the invention. The upper ends 40 of cables 26 are rigidly secured to support ring 24 by ferrules 40, or the like, in a conventional manner, as would be understood by those skilled in the art.

Support ring 24 is raised and lowered by a drive mechanism 42 in the base of the mast. The drive mechanism includes a winch 44 to which a drive cable 46 is secured. Drive cable 46 is wound and unwound from the winch 44 by an electric motor 48, or the like. Preferably, electric motor 48 is removable from drive mechanism 42 in a known manner so that it does not remain in the open or available for operation except when the maintenance crew brings it to the site and engages it with the drive mechanism.

The upper end of cable 46 is secured in any convenient manner to drive disk 30. When the drive motor 48 is operated to wind the cable 46 on the winch 44 cables 26 are lowered in the mast causing the ring to rise from the dotted line position in FIG. 1 to its uppermost position. When motor 48 is operated in the opposite direction to release cable 46 from the winch, cables 26 are allowed to rise in the mast under the influence of the weight of the ring which is then lowered to its dotted line position.

In accordance with an aspect of the present invention, a latching system 50 is provided on the support platform 16 to positively hold the ring in its uppermost position with the weight of the ring supported on the mast and relieved from the cables. Latching system 50 operates under the influence of drive motor 48, as described hereinafter.

Figure 2:
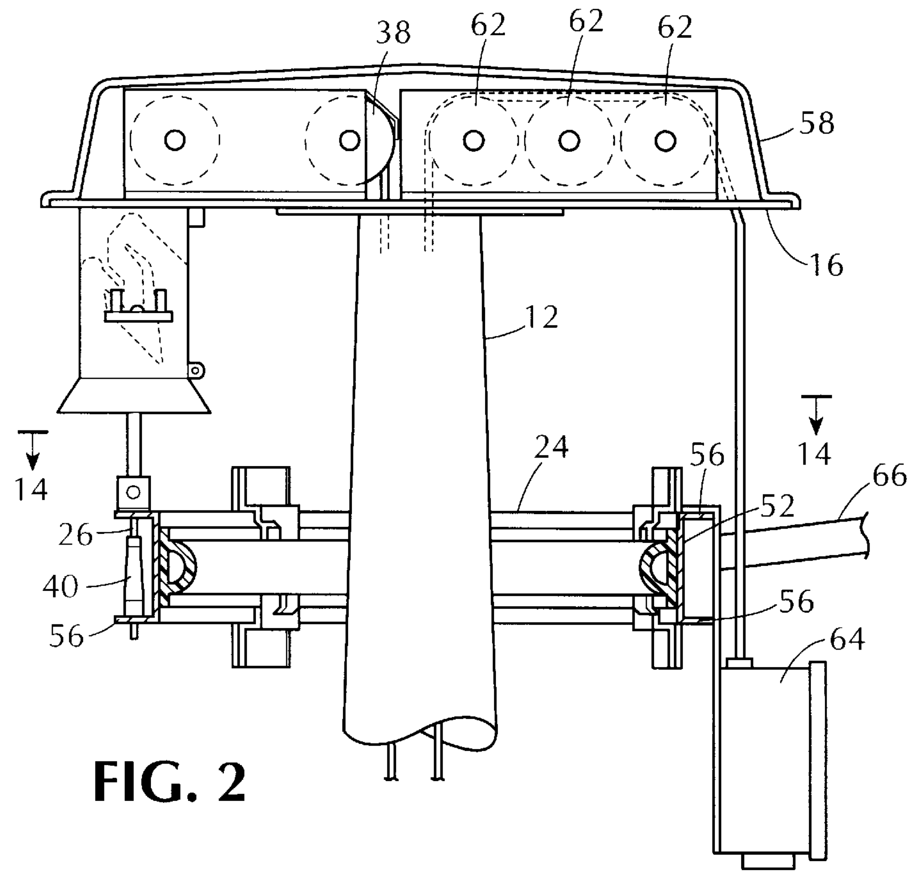
FIG. 2 is a side elevational view of the upper end of the support mast showing the support ring in its latched position.
Figure 3:
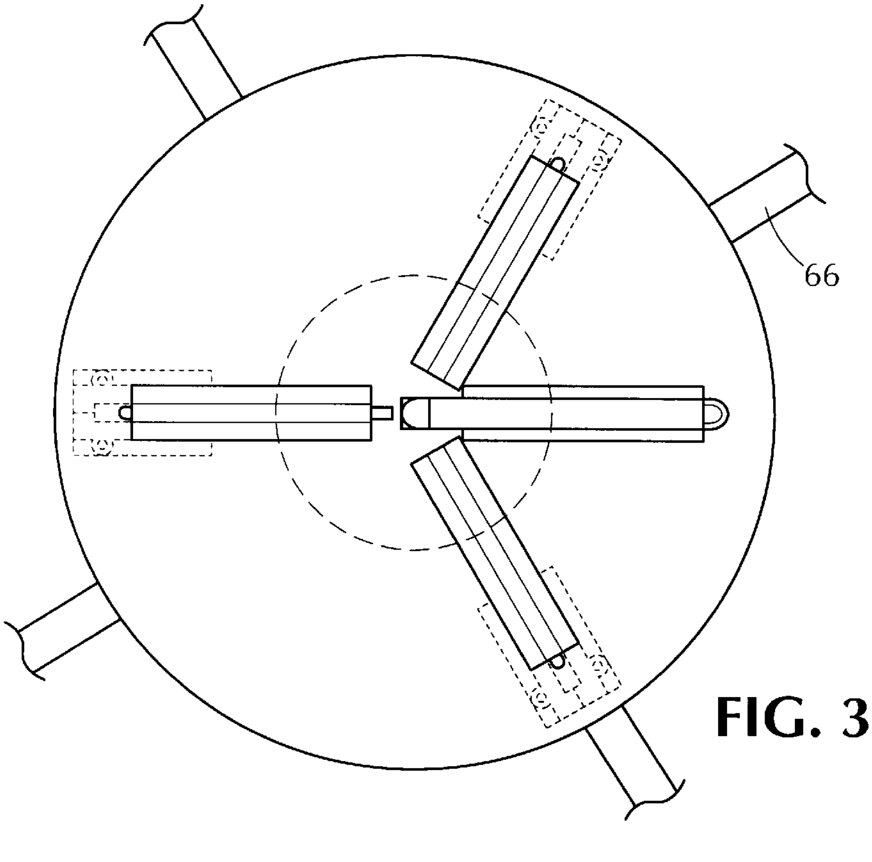
FIG. 3 is a partial top plan view of the top of the support mast.
Figure 4:
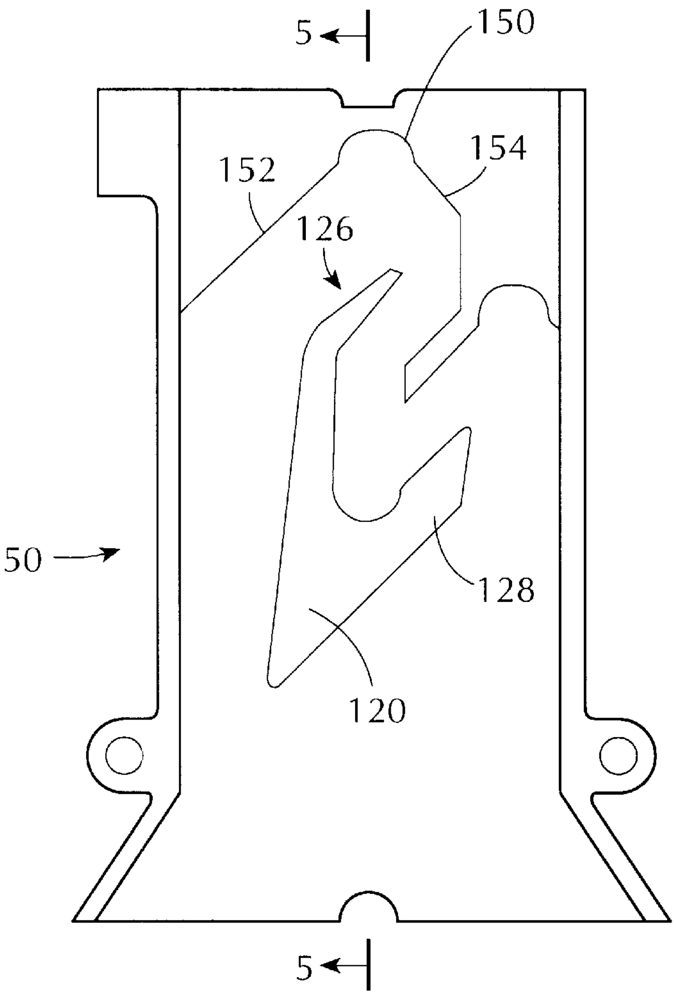
FIG. 4 is an interior elevational view of one side of the latching mechanism showing the cam surfaces formed therein.
Figure 5:
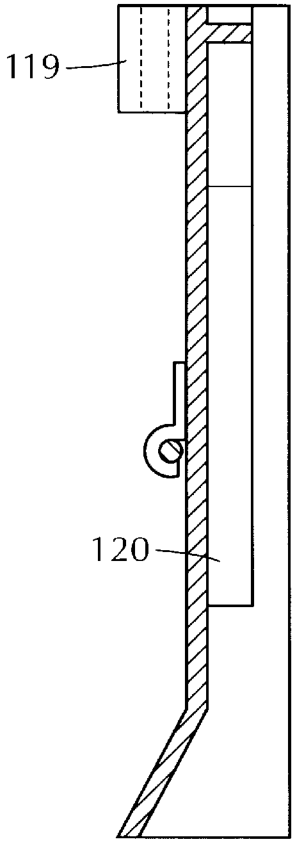
FIG. 5 is a sectional view taken along line 5—5 of FIG. 4.
Figure 6:
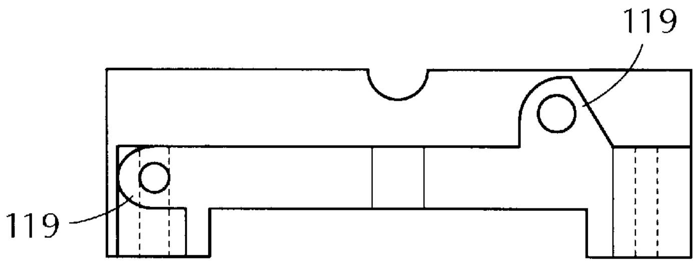
FIG. 6 is a top view of the portion of the latch mechanism shown in FIG. 4.

As seen in FIG. 2, support ring 24 has a generally C-shaped cross section. It includes a vertical web 52 and a pair of outwardly extending flanges 56. Cables 26 penetrate apertures in the upper flange 56 and are locked to ferrules 40 which are secured to the lower flanges 56 of the ring in a known manner. Support platform 16 may be covered by a dome 58, or the like, to protect rollers 38.

Electrical power is supplied to lamps 22 through an electrical cable 60 located within mast 12. Electrical cable 60 passes upwardly through the mast to a series of rollers 62 which guide the cable from the mast to a junction box 64 from which electrical wiring (not shown) is guided in the channel of ring 24 to support poles 66 of lamps 22.

Figure 16:
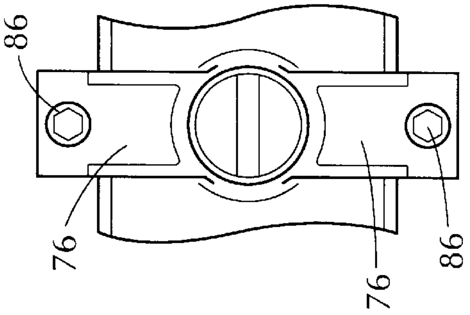
FIG. 16 is a sectional view taken along line 16—16 of FIG. 15.
Figure 15:
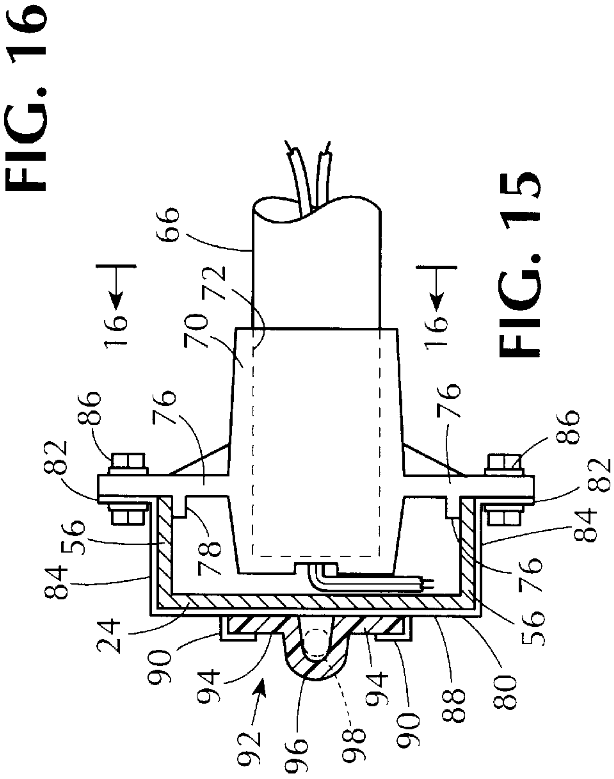
FIG. 15 is a sectional view taken along line 15—15 of FIG. 14.
Figure 14:
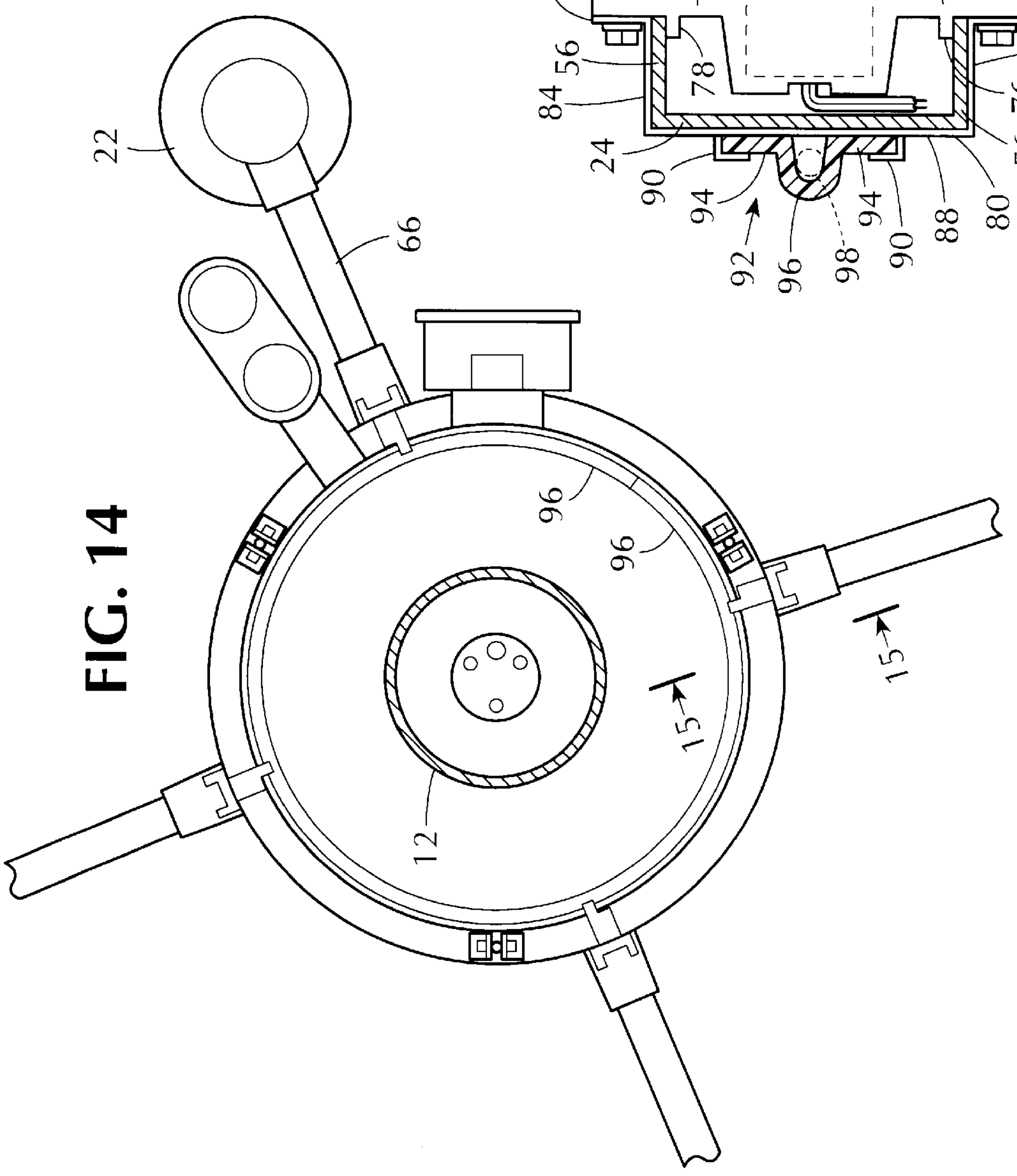
FIG. 14 is a sectional view taken along line 14—14 of FIG. 2.

Lamps 22 are of generally conventional construction, secured on the outer ends of arms 66. Those arms extend generally radially from the support ring, as seen in FIG. 14. The inner ends of the support arms 66 are mounted in sockets 70, shown in FIGS. 14, 15 and 16. These sockets each have an interior cylindrical receptacle 72 into which its associated pole 66 extends. The pole is held in place by one or more set screws (not shown).

Sockets 70 each have oppositely extending flanges 76 formed thereon including inner tabs 78 which are received between flanges 56 of support ring 24. The sockets are clamped to the support ring by generally C-shaped clamps 80 whose internal configuration is generally complementary to the external configuration of the support ring. Each clamp 80 has oppositely directed tabs 82 extending from its legs 84 which are adjacent the ends of socket flanges 76. These tabs are bolted to flanges 76 by bolts 86, or the like, in order to clamp the socket to the support ring. This construction makes it very simple for the entire lamp assembly to be removed and replaced from the support ring while, at the same time, providing a secure, rigid mounting for the lamps.

In accordance with yet another aspect of the present invention, the rear web 88 of each clamp 80 has a pair of spaced L-shaped tabs 90 formed thereon which define a channel on the back of the clamp. This channel is adapted to receive a bumper 92 which serves to protect the ring and the mast during raising and lowering operations should the ring sway sufficiently to cause its inner surface to engage the mast.

Bumper 92 is formed of polyurethane, rubber or other resilient material. It has a generally flat back wall 94 and a central resilient protuberance 96 extending towards the mast. The ends of the wall 94 are engaged and retained within flanges 90.

Bumper 92 is easily slipped into place and easily replaced. It is an elongated strip dimensioned so that its opposed ends 96 (see FIG. 15) abut each other when it is properly seated in place. In order to retain the ends together a piece of cable 98, shown in dotted lines in FIG. 15, may be installed in one end 96 prior to the installation of the bumper on the support ring and the other end is pushed over cable 98 when the bumper is completely installed on the ring to secure the two ends 96 together by a simple friction fit. This arrangement also provides for positive securement of the bumper to the ring while allowing rapid and easy replacement.

Latching mechanism 50 is shown in greater detail in FIGS. 4–13 of the drawings. The latching mechanism includes a support arm 100 associated with each of the cables 26. Support arms 100 are hollow and their associated cables 26 pass through their interior. The lower end of each arm has a support pin 104 pivotally mounted in a pair of angle members 106 which are secured by bolts 108 to the upper flange 56 of support ring 24.

The upper end of the support arm 100 has another transverse pin 110 rigidly mounted thereon in any convenient manner. This transverse support pin cooperates with cam surfaces on the sides 112 of a latch housing 114 to securely hold the support ring on the mast.

A latch housing 114 is associated with each of the cables 26 and is formed to allow its associated cable to pass therethrough to its associated rollers 38. Latch housing 114 is a metal casting having two substantially identical symmetrical sides 112. The upper end of these housings or castings are bolted to support platform 16 by bolts 118 mounted in bosses 119 on sides 112 in any convenient manner.

Each of the sides 112 of the casting or housing 114 has identical camming structures formed therein which define cam surfaces and passages for support pins 110 on arms 100. These cam structures are shown most clearly in FIGS. 4 and 7.

Figure 8:
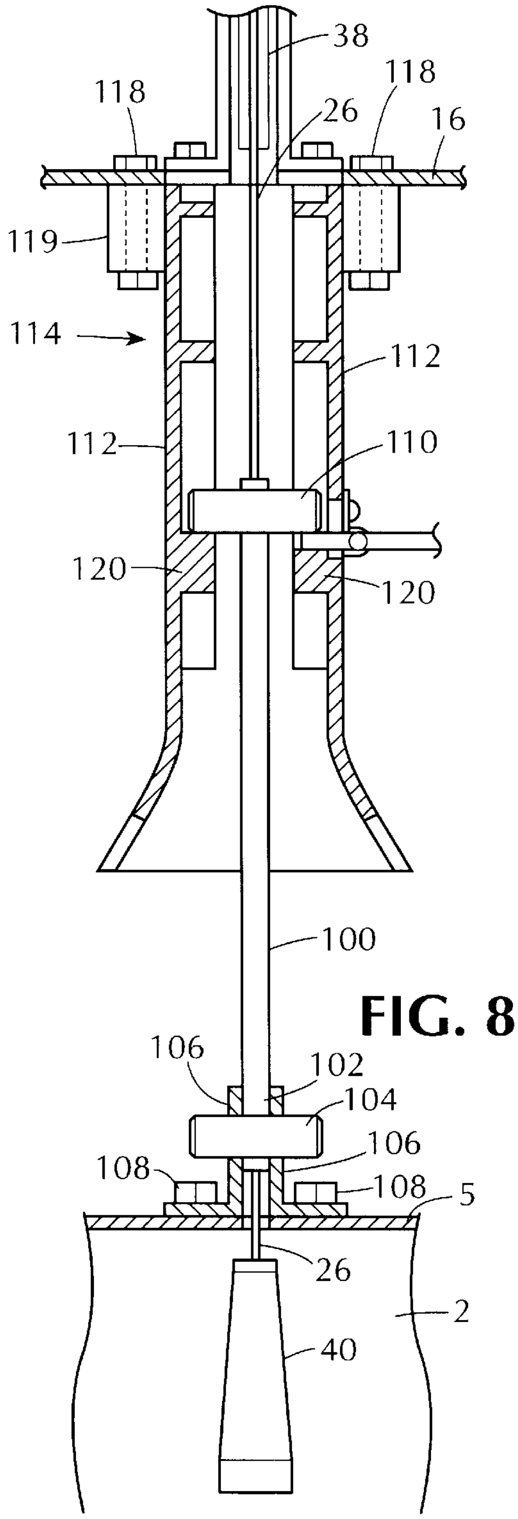
FIG. 8 is a sectional view taken along line 8—8 of FIG. 7.

A central generally C-shaped cam structure 120 is formed on each of the sides 112 and the two cam structures face each other in slightly spaced relationship, as seen in FIG. 8, to allow arm 100 and cable 26 to pass therebetween while pin 110 is guided by the cam surfaces. An upper cam structure 122 is also provided which has cam surfaces, described hereinafter, formed thereon facing downwardly towards the top of C-shaped cam structure 120 in order to define the path of travel for pin 110.

Figure 7:
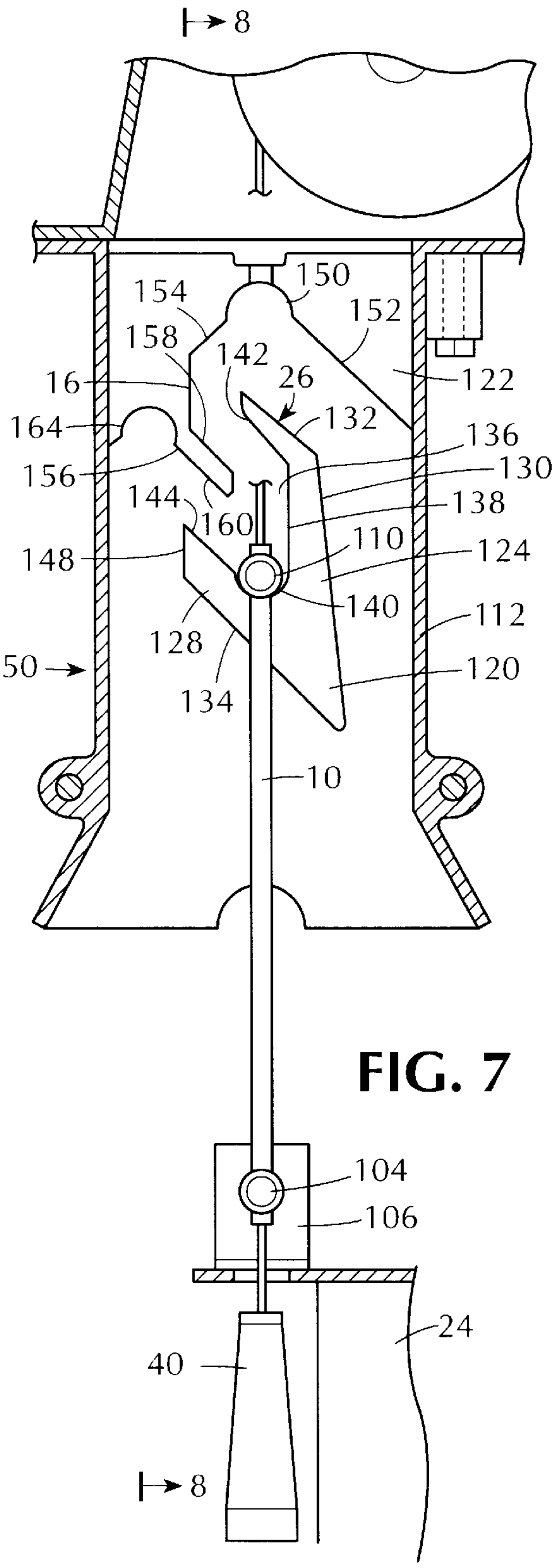
FIG. 7 is a partial sectional view of the latch mechanism showing the support arm in its latched position and the interior of the side of the latching mechanism opposite to that shown in FIG. 4.

As seen in FIG. 7, the generally C-shaped cam structure 120 has a web portion 124 and upper and lower legs 126 and 128, respectively. Web portion 124 has a straight slightly inclined cam surface 130 and the legs 126 and 128 have straight cam surfaces 132, 134, respectively, on their outer surfaces. These legs define a bight portion 136 in the cam. Bight portion 136 has an essentially vertical cam surface 138 formed therein which leads from a lower generally semi-circular pocket 140 to an inclined cam surface 142 on the inner side of leg 126. Leg 128 includes an inner cam surface 144 generally parallel to surface 142 and leading away from the pocket 140. The outer cam surface 134 of lower leg 128 also includes an extension cam surface 148 on its outer surface.

Upper cam member 122 includes a first pocket 150 formed therein which leads to a first flat inclined surface 152 that is generally parallel to cam surface 132. On the opposite side of pocket 150 cam 122 has a cam surface 154 leading away from the pocket 152 to an extension 156. Extension 156 has cam surfaces 158, 160 on opposite sides thereof generally parallel to cam surfaces 142 and 144. Extension 156 enters the bight portion of cam member 129 as shown in FIG. 7. Surface 154 includes a vertical cam surface portion 16 formed therein facing the surface 142 of leg 126.

The inclined surface 160 of cam extension 156 leads to a second pocket 164 which opens downwardly towards the lower leg 128 of cam member 120. As noted above, both sides 112 of the latching member 114 have identical cam surfaces.

In the position shown in FIG. 7, the support pins 110 of the support arms 100 are supported in pockets 140 of cam member 120. This is the latched position of the structure of the invention. In this position, the entire weight of support ring 24 and the lamps mounted thereon is suspended from the latch mechanisms 114 and top plate 16 on mast 12 with the weight relieved from cables 26.

Figure 9:
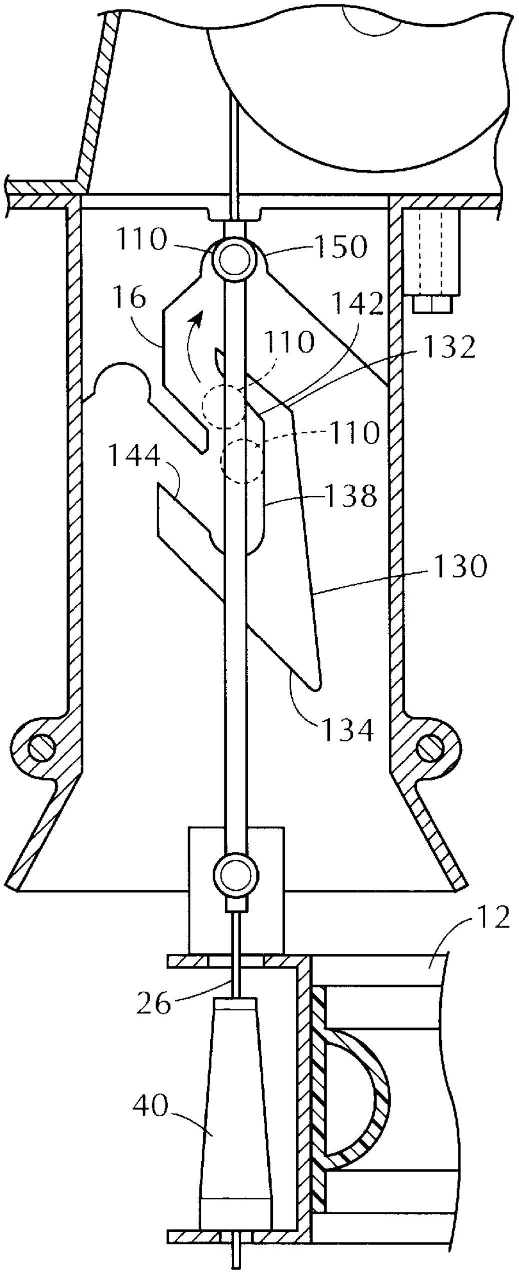
FIG. 9 is a view similar to FIG. 7 showing the movement of the support arm during the unlatching operation.
Figure 10:
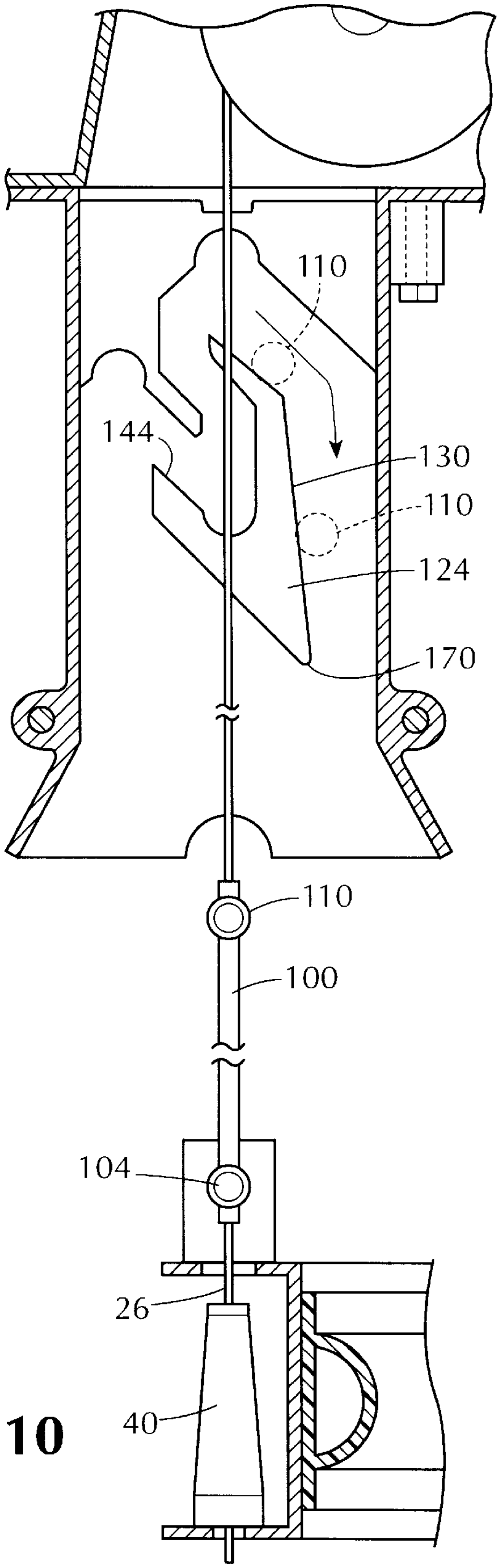
FIG. 10 is a view similar to FIG. 9 showing the movement of the support arm from the position shown in FIG. 9 to the lowermost position of the support ring.

In order to lower support ring 24, drive motor 48 is operated in a direction to wind cable 46 on winch 44 to raise the ring from the position shown in FIG. 7. As the ring moves upwardly, the pins 110 on support rods 100 travel upwardly in the latch mechanisms 114 along the surfaces 138 of cam members 120. As shown in FIG. 9, the pin 110 follows cam surface 138 to surface 142 where it is deflected by that surface of cam arm 126 to the left. This movement of the pin is permitted by the lower pivotal mounting of arm 100 and the flexible nature of the cable. Continued upward movement of support ring 24 causes pin 110 to escape from cam arm 126 and move upwardly following the surfaces 160 and 154 so that it ultimately is guided into pocket 150. That pocket blocks further upward movement of the support ring causing the motor 48 to stall. The motor preferably is an electric motor and therefore will continue to operate, but slip. This produces a signal to the operator that the latch is now free. The operator then reverses motor 48 to allow the cables to lower the support ring 12, i.e. to allow the ring to move down while the disk 30 moves up in the mast. Lowering the cables in this way causes pin 110 to move downwardly and engage surface 132 of cam member 120. As shown in FIG. 10, pin 110 will then follow surface 132 downwardly under the influence of gravity as the ring moves downwardly, will then engage cam surface 130 which continues to guide its downward movement. Ultimately, pin 110 moves past the bottom corner 170 of cam 120 where it is now free from engagement with any cam surface. The gravitational effects of the weight of the support ring cause arm 100 to pivot back to its vertical position, as shown in FIG. 10, and the ring continues to move downwardly to the dotted line position of FIG. 1.

Figure 11:
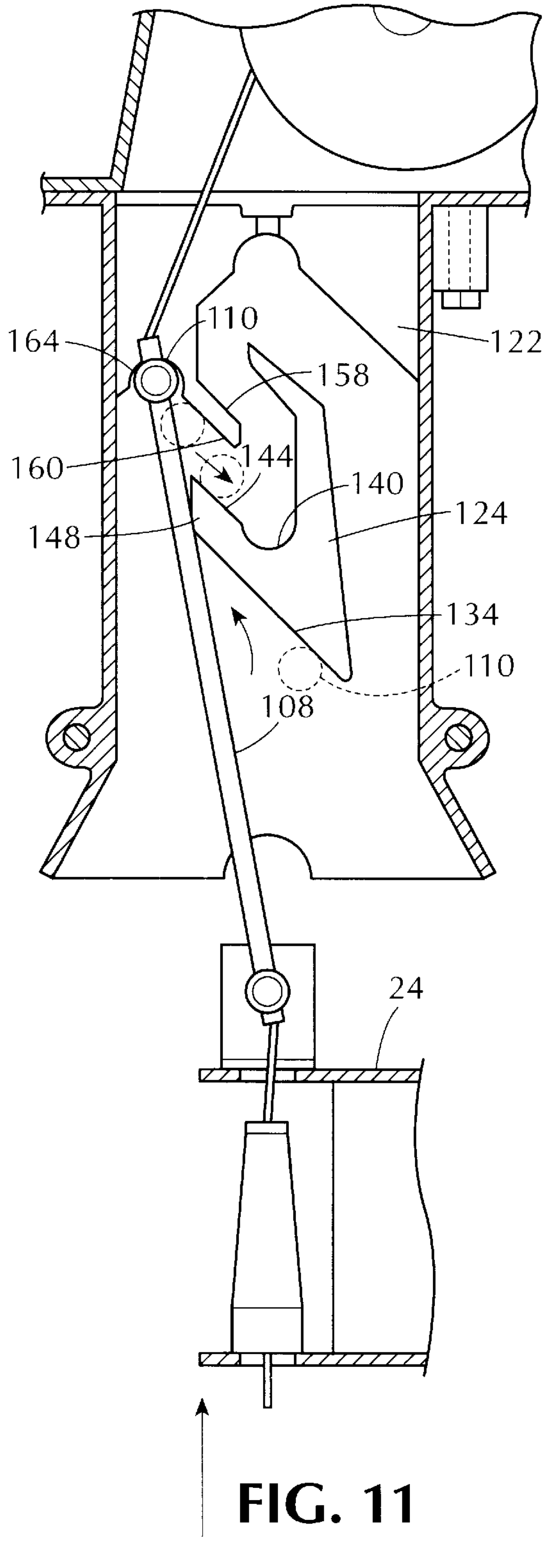
FIG. 11 is a view similar to FIG. 9 showing the movement of the support as the ring is being raised towards its latched position.
Figure 12:
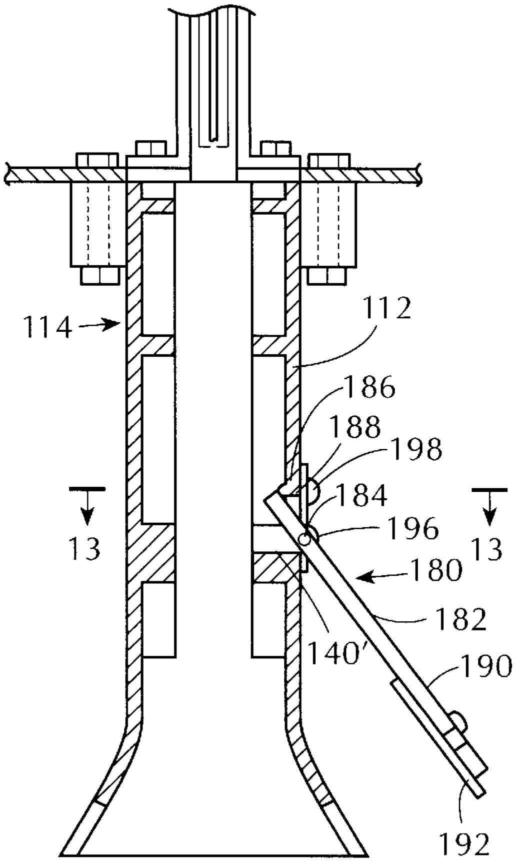
FIG. 12 is a partial sectional view similar to FIG. 8 showing the position of the signaling device when the support ring is unlatched.
Figure 13:
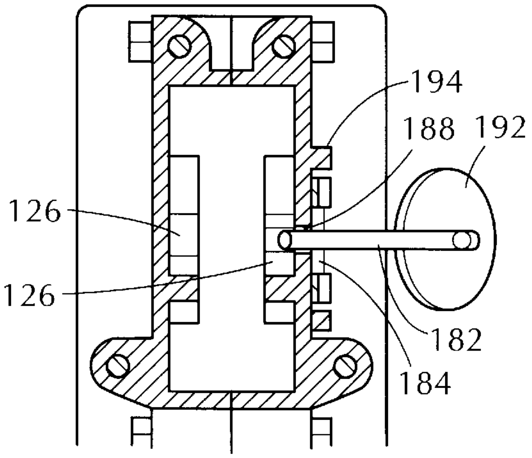
FIG. 13 is a sectional view taken along line 13—13 of FIG. 12.

After maintenance is completed, motor 48 is operated to raise support ring 24. As cable is wound on winch 44, the upper ends of the cables move upwardly and ultimately pin members 110 on support arms 100 move into engagement with the surface 134 of cam member 120, as shown in FIG. 11. Pin 110 then follows surface 134 and surface 148 into engagement with pocket 164 in upper cam member 122. Here, again, the engagement of the pin in the pocket stalls the drive motor signaling the operator that upward movement has been blocked. The operator then reverses the motor to lower the ring slightly. Allowing the cables to move downwardly in this way slackens the cables and causes the arm 108 under the influence of the weight of the ring to pivot towards a vertical position so that pin 110 follows surface 160 of extension 156. Further downward movement of the ring causes pin 110 to engage surface 144 which then guides pin 110 into pocket 140. At that point further downward movement of the ring is prevented and the pin has returned to the position shown in FIG. 7 with the ring is latched in place. The drive motor is then disconnected and the entire weight of the support ring is supported directly by the support arms 100 on the latch structures 16 and the mast.

In accordance with another feature of the present invention, a signaling device 180 is provided to signal the fact that the mechanism is latched in place. Signal device 180 includes a signal arm 182 which is pivotally mounted on the outer side wall of one of the sides 112 of the latch mechanism. The inner end 186 of the arm 182 penetrates an opening 188 in the side wall in order to enter the bight portion of cam 120. On this side the recess 140 in cam 120 has an additional pocket section 140' (see FIG. 11 and the dotted lines in FIG. 7) which is adapted to receive the end 186 of arm 182. By this construction, when pin 110 moves downwardly, as shown in dotted lines in FIG. 11, towards pocket 140 it engages end 186 of arm 182 moving it from the position shown in FIG. 12, to a horizontal position, shown in FIG. 1.

The outer end 190 of arm 182 includes a colored reflector 192 of conventional construction. In the horizontal position shown in FIG. 1, the reflector is clearly visible from below. When the latch mechanism is released, the pressure of the pin 110 on end 186 of arm 182 is relieved and the arm falls to its lower position, shown in FIG. 12, so that the reflector is not visible.

The pivotal mounting of the arm 182 on the side 112 is accomplished in any convenient manner. In the illustrative embodiment, arm 182 has an integral transverse pin 184 formed thereon which is secured in a C-shaped bracket 194 secured bolts or screws 198 into the exterior surface of side 112.

Accordingly, it is seen that a relatively simply constructed high mast mounting system is provided which allows rapid repair of the lamp fixtures and bumper structure while at the same time providing an positive latching mechanism that relieves strain from the cables while assuring direct transfer of load from the support ring to the mast structure.

Although an illustrative embodiment of the present invention has been described herein in connection with the accompanying drawings, it is to be understood that this invention is not limited to that precise embodiment and that various changes and modifications may be effected therein by those skilled in the art without departing from the spirit of this invention.

I claim:

1. A high mast lighting system comprising an elongated vertical mast having upper and lower ends, an annular lamp support ring surrounding said mast and having a plurality of lamps removably mounted thereon;

means for raising and lowering said ring along said mast between said upper and lower ends including a plurality of guide rollers mounted on said upper end of the mast and a plurality of flexible cables operatively connected at one end to said ring, trained over said rollers and extending downwardly therefrom in said mast and connected at their opposite ends to means in said base for drawing the cables downwardly in the mast to raise said ring;

said raising and lowering means also including rigid hollow latching arms respectively associated with each of said cables and being pivotally connected to said ring above the connection of each cable to the ring along an axis extending transversely of its associated cable with its associated cable passing therethrough;

a plurality of latch means mounted on said upper end of the mast respectively associated with each of said cables and adapted to engage cooperating means in said latching arms for selectively releasing the arm and ring for lowering and for latching the ring in its uppermost position, said cables passing through said latching means to said guide rollers;

said ring including an inner wall facing the mast and resilient bumper means mounted thereon facing the mast.

2. A high mast lighting system as defined in claim 1 including means on at least one of said latching means for providing a signal indicating that the ring is latched in place.

3. A high mast lighting system as defined in claim 2 wherein said ring is channel-shaped in cross section having a central web and two generally perpendicularly extending flanges, and said lamp including lamp support poles having inner ends extending generally radially from said ring and means for removably mounting said poles on the ring including sockets for respectively receiving their associated pole and having inner mounting tabs received in said channel between the flanges thereof and extensions from the socket extending beyond said flanges; and a channel-shaped clamp generally complementary to and receiving the portion of the ring at the socket and means for securing the clamp to the socket extensions to clamp the socket on the ring.

4. A high mast lighting system as defined in claim 3 wherein said clamps each has an inner face facing the mast and a pair of spaced L-shaped flanges formed thereon defining a channel therebetween, said bumper having a central enlarged bumper portion and a pair of opposed flat edges received in and held by said L-shaped flanges whereby to hold the bumper on the ring.

5. A high mast lighting system as defined in claim 1 wherein said latching means each includes a pair of spaced side walls having generally C-shaped cam members formed thereon and facing each other in spaced relation to allow the cable arm associated therewith to pass therebetween;

said side walls also having upper cam surfaces spaced from and generally following the configuration of the upper surfaces of the C-shaped cam members and including an extension surface entering the bight of the C-shaped cam in spaced relation thereto;

said arms each including an upper transverse guide pin adapted to follow the surfaces of said cam surfaces to latch and unlatch the ring in response to movement of the cable.

6. A high mast lighting system as defined in claim 5 wherein said generally C-shaped cam members include a central web having a straight outer cam surface inclined slightly from the vertical and two spaced legs having outer straight inclined cam surfaces which are generally parallel to each other, the bight of the generally C-shaped cam having a support pocket formed in the lower leg of the cam for receiving and supporting the transverse pin of the arm to latch the ring in the latch in its uppermost position.

7. A high mast lighting system as defined in claim 6 wherein the generally C-shaped cam has a vertical inner cam surface extending from said pocket upwardly towards the upper leg of the generally C-shaped cam surface and a first inner inclined surface on said upper leg, whereby when said means for raising and lowering the ring is operated to raise the ring from the latched position the transverse pin on said arm is guided by said vertical and inner inclined surfaces of the generally C-shaped cam out of the bight thereof;

said upper cam surface having a vertical guide surface spaced from and facing the inner inclined cam surface of the generally C-shaped cam and leading to a first semicircular pocket which engages said pin and stops upward movement of the support arm.

8. A high mast lighting system as defined in claim 7 including a first inclined surface generally parallel to the outer inclined surface of the upper leg of the generally C-shaped cam surface whereby when the means for raising and lowering the ring is reversed to lower the ring said inclined surfaces guide the pin away from the pocket in the upper cam surface and along the inclined outer surface of the web of the generally C-shaped cam to allow the ring to move downwardly along the mast.

9. A high mast lighting system as defined in claim 8 wherein said upper cam surface includes a second semicircular pocket opening downwardly towards the end of the lower leg of said generally C-shaped cam surface, said lower leg of the generally C-shaped cam surface having an inclined inner cam surface generally parallel to the inner inclined cam surface of the upper leg leading to the pocket in the generally C-shaped cam, and said extension having an inclined cam surface parallel to the inclined inner cam surface of the lower leg of said generally C-shaped cam whereby when the means for raising the ring is operated to raise the ring from its lower position to its upper position said pin engages the outer surface of the lower leg of the generally C-shaped cam and is guided into said second semicircular pocket whereby upward movement of the ring is stopped and upon operation of said means for raising the ring is reversed to lower the ring from that stopped position the pin is guided by the inclined surface of the extension and the inner inclined surface of the lower leg of the generally C-shaped clamp into the pocket in the bight of the generally C-shaped clamp and into its latched position.

10. A high mast lighting system as defined in claim 9 including means on at least one of said latching means for providing a signal indicating that the ring is latched in place.

11. A high mast lighting system as defined in claim 10 wherein said means for providing a signal comprises an arm member pivotally mounted on one of said sides of the latching member and having an inner end extending into the pocket of the generally C-shaped cam member and an outer end extending outwardly from the latching member whereby when the pin of the support arm moves into the pocket of the generally C-shaped cam member it engages the inner end of said signal arm and holds it in a generally horizontal position perpendicular to the side member.

12. A high mast lighting system as defined in claim 11 wherein said outer end of said signal arm includes a light reflector thereon.

13. A lamp support ring for a high mast lighting system including a vertical support mast, said lamp support ring comprising an annular channel having a generally C-shaped cross section including a generally vertical web and a pair of spaced outwardly extending legs, said channel including an inner surface on said web facing the mast and resilient bumper means mounted thereon facing the mast; and said bumper means includes a flat rear wall mounted on the inner face of the channel and a central hollow resilient central section extending from said rear wall toward the mast.

14. A lamp support ring for a high mast lighting system including a vertical support mast, said lamp support ring comprising an annular channel having a generally C-shaped cross section including a generally vertical web and a pair of spaced outwardly extending legs, said channel including an inner surface on said web facing the mast and resilient bumper means mounted thereon facing the mast; and means for removably mounting support poles for electrical lamps on said channel, said mounting means including a socket for receiving the inner end of a lamp support pole, said socket having inner mounting tabs received in said channel between the flanges thereof and extensions from the socket extending beyond said flanges;

and a channel-shaped clamp generally complementary to and receiving the portion of the ring at the socket and means for securing the clamp to the socket extensions to clamp the socket on the channel.

15. A high mast lighting system as defined in claim 14 wherein said clamp has an inner face facing the mast and a pair of spaced L-shaped flanges formed thereon defining a channel therebetween, said bumper having a central enlarged bumper portion and a pair of opposed flat edges received in and held by said L-shaped flanges thereby to hold the bumper on the channel.

16. A latching system for a high mast lighting system including a hollow central mast having upper and lower ends, a light support ring surrounding said mast, a plurality of cables secured at one end to said ring, trained over a plurality of guide rollers mounted on the top of the mast and extending downwardly in the mast, said cables having opposite lower ends in the mast and reversible drive means for moving said lower ends of the cable upwardly and downwardly in the mast to raise and lower the ring, said latching system including at least one latching body mounted on the upper end of the mast and receiving therein one of said cables in its path of travel from the ring to the guide rollers, said latching system including a pair of spaced side walls each having a generally C-shaped cam member formed thereon, said generally C-shaped cam members facing each other in spaced relation to allow the cable associated therewith to pass therebetween and defining a bight portion therein;

said generally C-shaped cam members having inner and outer cam surfaces and said side walls having upper cam surfaces spaced from and generally following the configuration of the upper cam surfaces of the C-shaped cam members and including an extension surface entering the bight of the C-shaped cam in spaced relation thereto;

a rigid hollow latching arm pivotally mounted on the ring above the connection of the cable to the ring, said arm including an upper transverse guide pin adapted to follow the surfaces of said cam surfaces to latch and unlatch the ring in response to movement of the cable.

17. A latching system as defined in claim 16 wherein said generally C-shaped cam member includes a central web having a straight outer cam surface inclined slightly from the vertical and two spaced legs having outer straight inclined cam surfaces which are generally parallel to each other, the bight of the generally C-shaped cam having a support pocket formed in the lower leg of the cam for receiving and supporting the transverse pin of the arm to latch the ring in its uppermost position.

18. A latching system as defined in claim 17 wherein the generally C-shaped cam has a vertical inner cam surface extending from said pocket upwardly towards the upper leg of the generally C-shaped cam surface and a first inner inclined surface on said upper leg, whereby when said drive means for raising and lowering the ring is operated to raise the ring from the latched position the transverse pin on said arm is guided by said vertical and inner inclined surfaces of the generally C-shaped cam out of the bight thereof;

said upper cam surface having a vertical guide surface spaced from and facing the inner inclined cam surface of the generally C-shaped cam and leading to a first semicircular pocket which engages said pin and stops upward movement of the support arm.

19. A latching system as defined in claim 18 including a first inclined surface generally parallel to the outer inclined surface of the upper leg of the generally C-shaped cam surface whereby when the means for raising and lowering the ring is reversed to lower the ring said inclined surfaces guiding the pin away from the first pocket in the upper cam surface and along the inclined outer surface of the web of the generally C-shaped cam to allow the ring to move downwardly along the mast.

20. A latching system as defined in claim 19 wherein said upper cam surface includes a second semicircular pocket opening downwardly towards the end of the lower leg of said generally C-shaped cam surface, said lower leg of the generally C-shaped cam surface having an inclined inner cam surface generally parallel to the inner inclined cam surface of the upper leg leading to the pocket in the generally C-shaped cam, and said extension having an inclined cam surface parallel to the inclined inner cam surface of the lower leg of said generally C-shaped cam whereby when the drive means for raising the ring is operated to raise the ring from its lower position to its upper position said pin engages the outer surface of the lower leg of the generally C-shaped cam and is guided into said second semicircular pocket whereby upward movement of the ring is stopped and upon operation of said drive means in reversed to lower the ring from that stopped position the pin is guided by the inclined surface of the extension and the inner inclined surface of the lower leg of the generally C-shaped clamp into the pocket in the bight of the generally C-shaped clamp and into its latched position.

21. A latching system as defined in claim 20 including means for providing a signal indicating the latched position of the ring comprising an arm member pivotally mounted on one of said sides of the latching member and having an inner end extending into the pocket of the generally C-shaped cam member and an outer end extending outwardly from the latching member whereby when the pin of the support arm moves into the pocket of the generally C-shaped cam member it engages the inner end of said signal arm and holds it in a generally horizontal position perpendicular to the side member.

22. A latching system as defined in claim 21 wherein said outer end of said signal arm includes a light reflector thereon.

* * * * *